Jan. 7, 1941.  S. A. HORSTMANN  2,227,715
SCREW THREAD GRINDING MACHINE
Filed Feb. 21, 1938  2 Sheets-Sheet 1
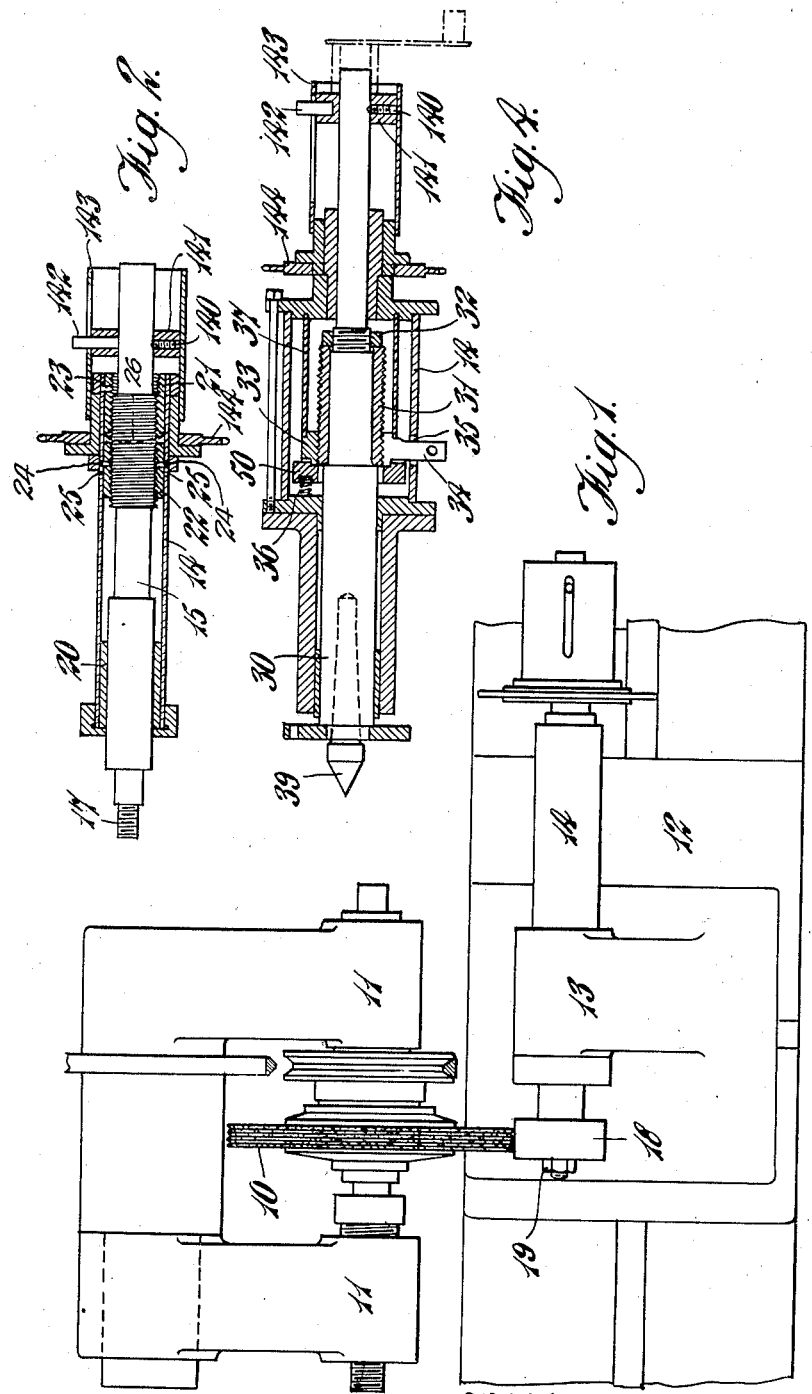
SIDNEY ADOLPH HORSTMANN
INVENTOR
By (signature)
HIS ATT'Y.

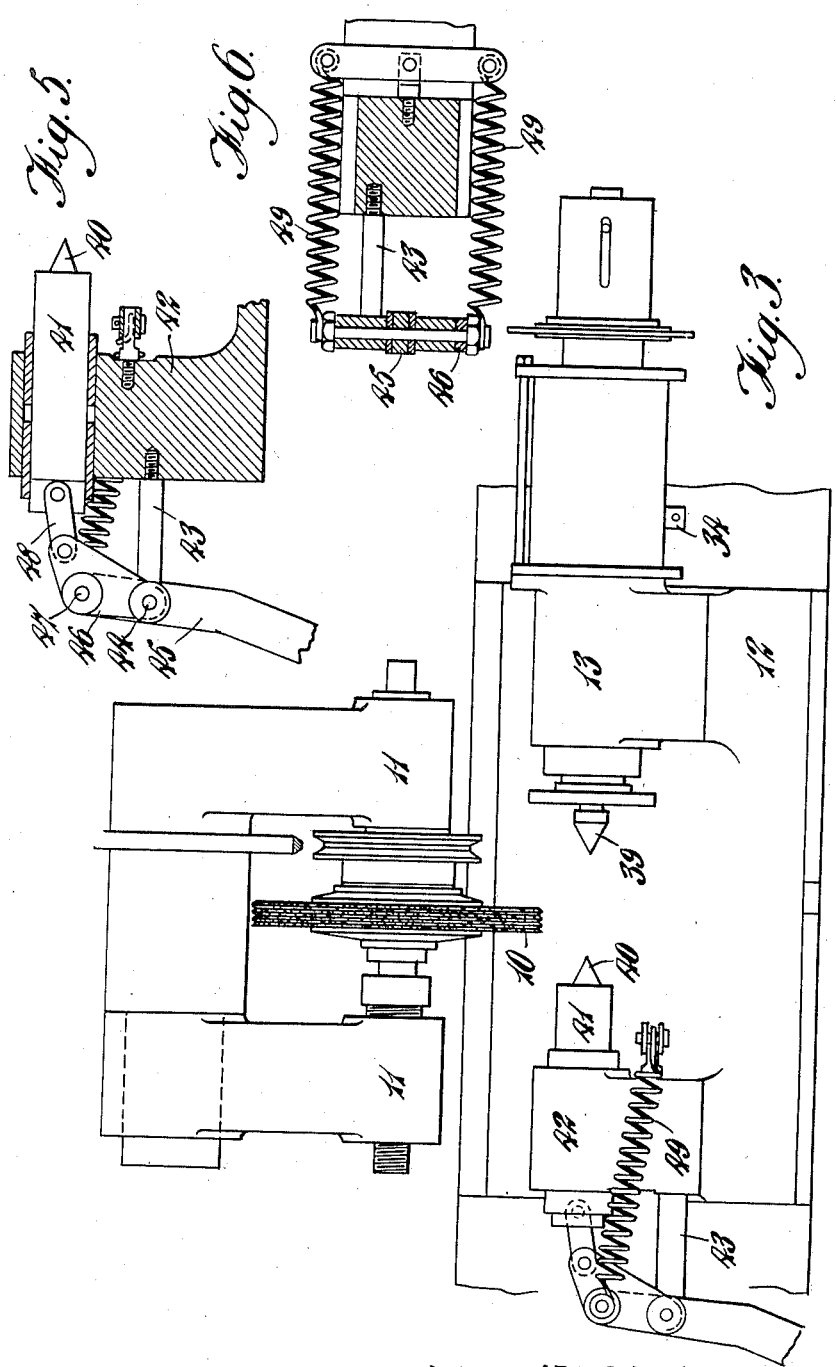

Patented Jan. 7, 1941

2,227,715

UNITED STATES PATENT OFFICE 2,227,715

SCREW THREAD GRINDING MACHINE

Sidney Adolph Horstmann, Bath, England

Application February 21, 1938, Serial No. 191,737
In Great Britain February 22, 1937

1 Claim. (Cl. 51—95)

This invention relates to improvements in screw thread grinding machines, such as are used for the production of screw threads for gauges, taps, dies and the general formation of threads on a work piece by grinding, and of the kind in which the work piece is rotated and axially, or substantially axially, traversed across a formed grinding wheel. The chief objects of the present invention are to provide a thread grinding machine which is comparatively cheap to manufacture; quicker in operation than the thread grinding machines which have been heretofore proposed and which does not require the attention of a skilled operative for its satisfactory operation. A further object of the present invention is generally to simplify the construction of a thread grinding machine and to enable the same to produce screw threads of a high degree of accuracy such as are suitable for screw gauges and the like.

The screw thread grinding machine according to the present invention is characterised in that the lead screw adapted to rotate and traverse the work piece and the nut with which said lead screw co-operates form a unitary assembly which can be readily removed as a whole from the machine and substituted by a different lead screw and nut assembly.

Conveniently the lead screw is provided at one end with means whereby the work piece may be mounted thereon, the assembly then constituting a detachable quill unit.

Means are preferably provided for preventing backlash in the thread of the lead screw and when a spring-loaded tail stock centre is provided the spring, instead of acting directly on the tail stock centre, operates thereon through a system of links and levers so proportioned and arranged that they decrease the advantage of the spring over the tail stock centre as the spring effect increases, whereby a constant or substantially constant pressure is maintained on the tail stock centre at all positions of the same.

In order that this invention may be the more clearly understood and readily carried into effect, I will proceed to describe the same with reference to the accompanying drawings, which illustrate by way of example and not of limitation certain convenient embodiments of this invention, and in which:

Figure 1 is a somewhat diagrammatic view of those parts of a thread grinding machine with which the present invention is more particularly concerned when the same is adapted for the use of detachable quill units.

Figure 2 is a section through a convenient form of the quill unit employed in the machine shown in Figure 1.

Figure 3 is a view similar to Figure 1 showing the machine adapted for operating on work pieces mounted between centres, and Figure 4 is a longitudinal section through the preferred form of lead screw and nut unitary assembly employed in the machine shown in Figure 3.

Figures 5 and 6 are respectively vertical and transverse sections through the special form of spring-loaded tail stock shown in Figure 3.

Referring now to the drawings, the thread grinding machine is of the kind in which the work piece is rotated anad traversed across the periphery of a formed grinding wheel and is generally of the known construction. In order, therefore, to simplify the description and illustration of the present invention several of the usual parts, such as the bed of the machine, the driving means both for the grinding wheel and the work piece, and so forth, have been omitted from the drawings. Such means may conveniently follow normal practice in carrying out the present invention and will not be further described. The grinding wheel 10, which has formed a plurality of annular grooves, each of which conforms to all the necessary characteristics of the screw thread to be ground, is mounted in bearings 11 in such a manner that it can rotate at a high speed free from vibration. 12 is the cross slide of the machine which is mounted and manually or otherwise adjusted in the usual manner. This cross slide carries the head stock 13 in which is mounted in a readily removable manner the detachable quill unit, the construction of which is shown more particularly in Figure 2.

Referring now to Figure 2, the quill unit shown therein comprises an outer sleeve 14 which is adapted to be rigidly fixed in the head stock 13 by any suitable means. Rotatably disposed within this sleeve is a lead screw 15 which projects beyond the sleeve at its rear end where it has secured to it, by means of a screw 140, a collar 141 which, in turn, has a pin 142 sliding in a sleeve 143 which carries a sprocket 144 by means of which the lead screw may be rotated, the sleeve 143 and sprocket support being freely rotatable about the sleeve 14. At its forward end the lead screw projects beyond the sleeve and is provided with a screw-threaded part 17 on to which the work piece 18 (Figure 1) may be fixed by means of the nut 19. Alternatively, the work piece may be fixed in position by means of a chuck, taper shank fitting, or any other means. At its forward end the lead screw 15 is freely supported in a bearing 20 in the sleeve. Towards its rear end the lead screw is engaged by the nut structure which comprises two parts 21 and 22. One of these parts 21 is held in a fixed position in the sleeve, for example, by means of a pin 23 whilst the other part 22 has a limited axial movement in the sleeve 14 but is held against rotary movement therein. This is secured by means of pins 24 on the part 22 which are located in longitudinal slots 25 in the sleeve 14. Between the two parts 21 and 22 of the nut structure is arranged means such, for example, as a spring 26, which tends to separate the two parts of the nut (or alternatively to draw the same together). Consequently the lead screw 15 will always be positively engaged by opposing flanks of the nut structure and hence all backlash will be avoided. This feature is of particular advantage since it will enable highly accurate screw threads to be cut on the work piece 18 and, furthermore, will enable a cut to be taken, if desired, on both traverses of the work piece across the edge of the grinding wheel 10.

The slides on which the quill units are carried and by means of which their position relative to the grinding wheel 10 may be adjusted, are preferably spring or weight loaded in the known manner in order to prevent backlash therein.

It will be appreciated that the parts shown in Figure 2 form a unitary and complete assembly which can be easily mounted in and dismounted from the machine and which is effective to rotate and traverse the work piece across the periphery of the grinding wheel. Such detachable quill units, of which one for each particular thread to be ground (with its appropriate lead screw thread and nut) is provided, will materially facilitate the setting up of the thread grinding machine for grinding different screw threads.

Means are also provided in any suitable and known manner for adjusting the inclination of the axis of the grinding wheel and/or the axis of the quill unit in order to take into account the different helix angles of the different threads and/or modify the elements of the same.

Figures 3 and 4 illustrate a slight modification of the machine according to the present invention in which the work piece 18 instead of being supported on the quill unit shown in Figure 2 is mounted between centres. In this case it is merely necessary to substitute for the screwed forward end 17 of the lead screw 15 a freely rotatable head stock centre.

A modified form of the lead screw and nut unitary assembly is, however, possible, this modified construction being applicable also to the quill unit arrangement illustrated in Figure 2. Such construction is illustrated in Figure 4 and is broadly similar to the construction shown in Figure 2, like reference numerals being used to indicate like parts. In this case the lead screw part 30 instead of itself being screw-threaded to co-operate with the nut structure has a threaded sleeve 31 clamped thereon by means of the nut 32. This screwed sleeve 31 co-operates with the nut device 33 which is split and provided with an extension 34 which extends through a limited longitudial slot 35 in the outer sleeve 14. The nut is spring biased towards the back end of the sleeve 14 by means of a ring 50 which bears against the nut 33 and is controlled by a plurality of coiled springs, one of which may be seen at 36. 37 is a distance tube bearing on the nut 33. The forward end of the lead screw member 15 is provided with a head stock centre 39.

As above stated, in the construction of machine illustrated in Figure 3 the work piece is mounted between centres. Now it will be obvious that due to the traverse of the work piece 18 during the grinding operation the centres also must move and that whilst this represents no disadvantage in the case of one centre (the quill unit illustrated in Figures 1 and 2), the arrangements utilised for that centre are inapplicable to the other centre. Nor is it satisfactory to use an ordinary spring-loaded tail stock centre since such an arrangement would give rise to an excess pressure at one end of the traverse. Such increase in pressure would give rise to inaccuracies in the thread cut due, inter alia, to the oil being squeezed out from the threads of the lead screw.

To this end, therefore, it is desirable to use the special form of tail stock shown more particularly in Figures 5 and 6 of the accompanying drawings. In this arrangement the tail stock centre 40 is spring-loaded, but instead of the springs acting directly on the tail stock centre the same operate thereon through a system of links and levers which are so proportioned and arranged that they decrease the advantage of the spring over the tail stock centre as the spring effect increases and thereby maintain a constant, or substantially constant, pressure on the tail stock centre throughout the full traverse.

As shown in Figures 5 and 6, the tail stock centre is carried by a mandrel 41 which is freely mounted in the tail stock 42, the centre 40 being fitted to the mandrel 41. Outstanding from the tail stock 42 is a standard 43, on the end of which is pivoted as at 44 a manually operable lever 45. Also pivoted on the pivot 44 are two links 46 arranged one above and one below the lever 45, the end of the lever being pivotally connected to the links 46 as at 47. The forward ends of the links 46 are connected to the mandrel 41 by means of a link 48. Tension springs 49 are connected between the pivot points 47 and fixed points on the tail stock 42. It will be seen that with the parts proportioned and arranged as shown in these two figures the advantage of the springs 49 over the tail stock centre 40 is decreased proportionately to the increase of the spring effect thereon (and vice versa) with movement of the tail stock whereby a constant, or substantially constant, pressure on the tail stock centre 40 is maintained whatever be the position of the same.

I claim:

In a thread grinding machine, a frame, a grinding element carried by said frame including a head stock, a unitary assembly for traversing a work piece past said grinding element, said assembly comprising an outer mounting formed as a sleeve removably mounted in said stock head, a lead screw nut disposed in said mounting, means to prevent rotation of said nut relative to said mounting, and a lead screw supported in said mounting for simultaneous rotary and axial movement relative thereto, said screw having one portion in engagement with said nut and another portion projecting from said mounting, means for attaching the work piece to said projecting screw portion, means for rotating said screw relative to said mounting and nut, and resilient means for axially biasing said screw relative to said frame to prevent backlash in the thread of the screw, said sleeve surrounding all of the other elements of said unitary assembly.

SIDNEY ADOLPH HORSTMANN.